(12) United States Patent
Shekalim

(10) Patent No.: US 7,954,732 B2
(45) Date of Patent: Jun. 7, 2011

(54) IRRIGATION SYSTEM AND METHOD

(76) Inventor: Avraham Shekalim, Nesher (IL)

( * ) Notice: Subject to any disclaimer, the term of this patent is extended or adjusted under 35 U.S.C. 154(b) by 0 days.

(21) Appl. No.: 11/755,760

(22) Filed: May 31, 2007

(65) Prior Publication Data
US 2007/0282264 A1 Dec. 6, 2007

(30) Foreign Application Priority Data
May 31, 2006 (IL) .......................................... 176056

(51) Int. Cl.
B05B 15/00 (2006.01)
(52) U.S. Cl. ....................................................... 239/542
(58) Field of Classification Search .......... 604/118–121, 604/131; 239/542, 547, 562, 266–268, 145, 239/99; 405/36–51
See application file for complete search history.

(56) References Cited

U.S. PATENT DOCUMENTS

| | | | |
|---|---|---|---|
| 3,004,330 A | 10/1961 | Wilkins | |
| 3,426,544 A | 2/1969 | Curtis | |
| 3,698,195 A | 10/1972 | Chapin | |
| 3,797,741 A * | 3/1974 | Spencer | 239/11 |
| 3,866,833 A * | 2/1975 | Shibata et al. | 239/76 |
| 4,473,191 A | 9/1984 | Chapin | |
| 4,781,217 A | 11/1988 | Rosenberg | |
| 5,314,116 A | 5/1994 | Krauth et al. | |
| 5,353,993 A | 10/1994 | Rosenberg | |
| 5,399,160 A * | 3/1995 | Dunberger et al. | 604/31 |
| 5,531,381 A | 7/1996 | Ruttenberg | |
| 5,601,381 A | 2/1997 | Hadar et al. | |
| 5,620,143 A | 4/1997 | Delmer et al. | |
| 6,691,739 B2 * | 2/2004 | Rosenberg | 137/614.2 |
| 6,764,029 B2 * | 7/2004 | Rosenberg | 239/542 |

* cited by examiner

Primary Examiner — Theodore J Stigell
Assistant Examiner — Imani Hayman
(74) Attorney, Agent, or Firm — Mark M. Friedman

(57) ABSTRACT

An irrigation system has an elongated irrigation tube subdivided by an integrally formed internal partition into a first lumen and a second lumen. At one end of the tube, a supply connection connects a water supply to the first lumen while at the other a termination arrangement defines a flow path from the first lumen to the second lumen. There is thus defined a water flow path which passes from the supply connection along the first lumen and then via the termination arrangement back along the second lumen. Water is released either by openings spaced along the tube connecting to the second lumen, or by the use of porous material for the irrigation tube. The partition is preferably flexible so that, under the pressure differentials occurring during use, an effectively conical flow path is created.

13 Claims, 9 Drawing Sheets

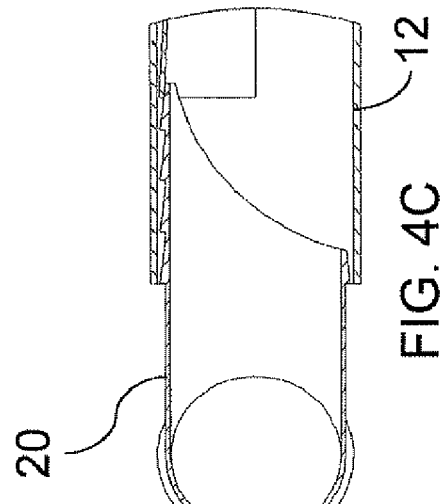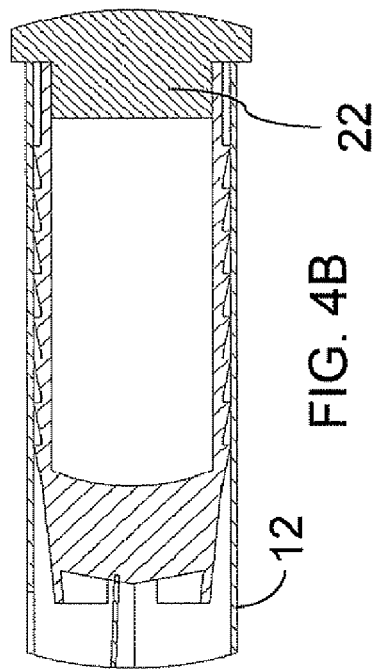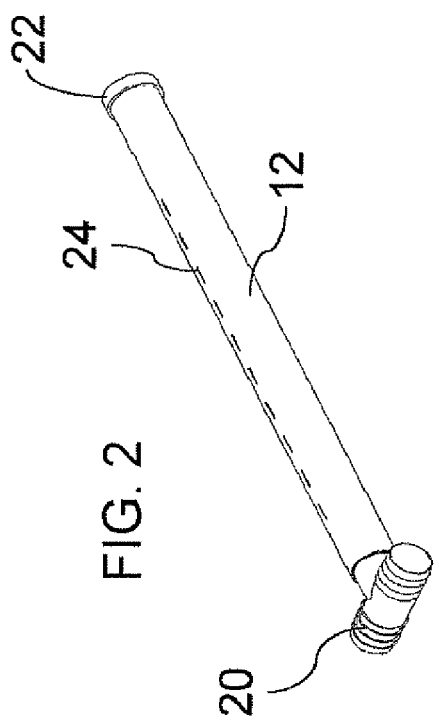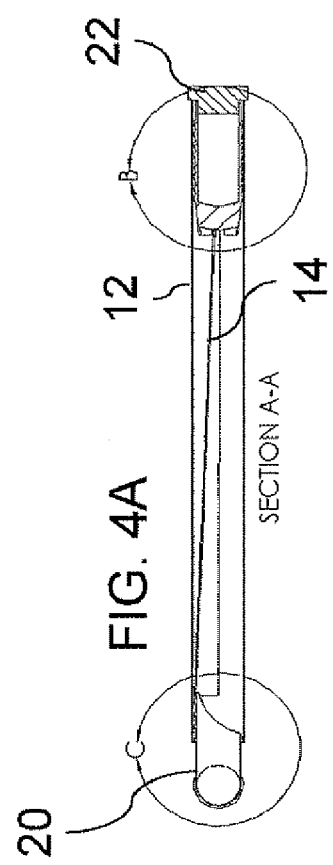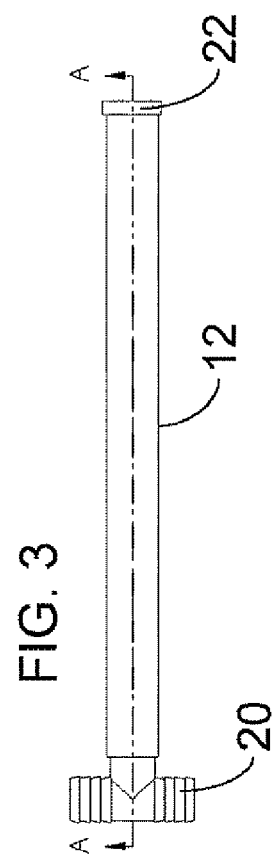

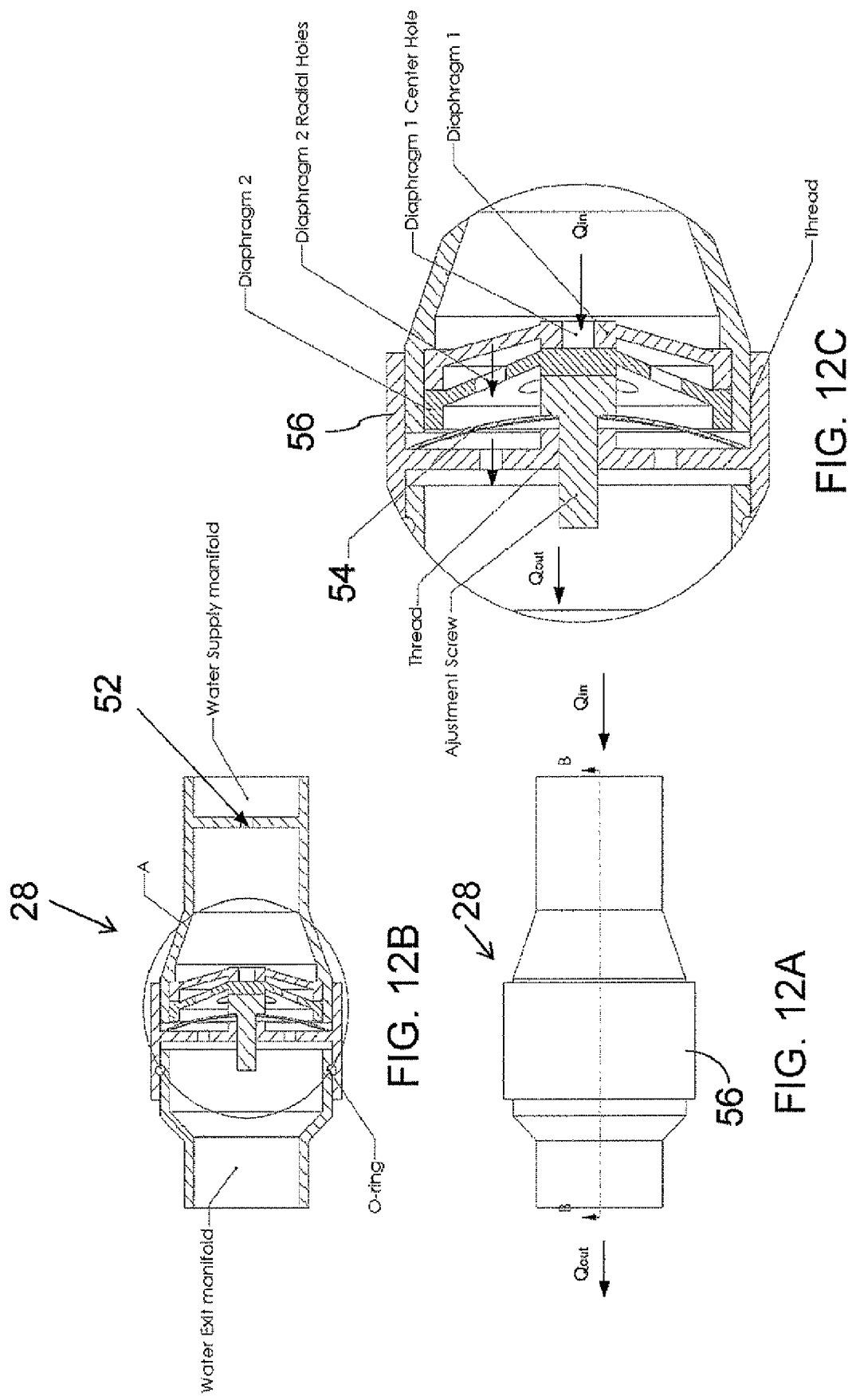

IRRIGATION SYSTEM AND METHOD

FIELD AND BACKGROUND OF THE INVENTION

The present invention relates to irrigation systems and, in particular, it concerns an irrigation system and method which achieve a conical flow path.

In the field of drip irrigation, there is a natural tendency towards non-uniform release of water along the length of an irrigation tube due to variations in supply pressure and pressure loss due to energy losses and accumulated release of water along the length of the tube. The common approach to ensuring a roughly uniform distribution of water along the length of the tube is to provide irrigation tubes with pressure-regulating drip emitters installed along the tube. The pressure-regulating drip emitters are themselves a significant component of the cost of such products, and the manufacturing process is greatly complicated by the need to deploy the emitters correctly within the tube and ensure that perforation of the tube wall is spatially coordinated with the emitter positions.

Various attempts have been made to achieve regulation of water release from drip apertures without requiring insertion of distinct drip emitters within the tube. Examples of such attempts may be found in U.S. Pat. Nos. 4,473,191 to Chapin and 5,620,143 to Delmer et al. In these devices, attempts are made to produce structures similar to the aforementioned drip emitters by embossing structures into a region of a flat extruded strip which is then sealed to itself with overlap to form a tube. In these cases too, the production techniques are complex.

An alternative approach to controlled irrigation is the use of porous-wall irrigation tubes. These tubes are particularly suited to subterranean use since their porous properties are not compromised by the presence of mud and dirt, and therefore offer advantages of reduced evaporation losses, reduced maintenance problems and high proximity to the roots of the plants. However, such porous irrigation tubes also suffer from a pronounced problem of non-uniform flow rates, with greater amounts of water being released at the higher pressure supply end of the line than at the opposite end.

There is therefore a need for an irrigation system which would employ an easily produced tube structure which provides relatively uniform release of water drops along its length.

SUMMARY OF THE INVENTION

The present invention is an irrigation system and corresponding method.

According to the teachings of the present invention there is provided, an irrigation system comprising: (a) an elongated irrigation tube; (U) a partition integrally formed with the elongated irrigation tube so as to subdivide an inner volume of the irrigation tube into a first lumen and a second lumen; (c) a supply connection for connecting a water supply to the first lumen; (d) a termination arrangement configured to define a flow path from the first lumen to the second lumen; and (e) a plurality of openings spaced along the irrigation tube for releasing water from the second lumen, such that water flows from the supply connection along the first lumen and then via the termination arrangement back along the second lumen to be released via the plurality of openings.

According to a further feature of the present invention, the partition is a flexible partition such that cross-sectional areas of the first and second lumens vary as a function of a pressure difference between the first and second lumens.

According to a further feature of the present invention, the openings are implemented as slits formed in a wall of the irrigation tube.

According to a further feature of the present invention, the irrigation tube and the partition are configured so as to cause opening of the openings as a function of a pressure difference between the first and second lumens.

According to a further feature of the present invention, the irrigation tube and the partition are integrally formed as a continuous extruded product of uniform cross-section other than the openings.

According to a further feature of the present invention, the termination arrangement includes a blade element deployed to breach a terminal region of the partition so as to facilitate flow from the first lumen to the second lumen.

According to a further feature of the present invention, there is also provided a water pulsator associated with the supply connection so as to limit a flow rate of water through the irrigation system.

According to a further feature of the present invention, there is also provided a water pressure regulator associated with the supply connection.

There is also provided according to the teachings of the present invention, an irrigation method comprising: (a) providing an irrigation system defining a flow path having an effective length and a plurality of water outlets spaced along at least part of the effective length; and (b) supplying water to the irrigation system so that the water is released from the plurality of water outlets, wherein, at least during supplying of the water, the irrigation system exhibits a substantially continuous reduction in effective cross-sectional area of the flow path as a function of distance along the flow path.

According to a further feature of the present invention, the irrigation system includes: (a) an elongated irrigation tube; (b) a flexible partition integrally formed with the elongated irrigation tube so as to subdivide an inner volume of the irrigation tube into a first lumen and a second lumen; (c) a supply connection for connecting a water supply to the first lumen; (d) a termination arrangement configured to define a flow path from the first lumen to the second lumen; and (e) a plurality of openings spaced along the irrigation tube for releasing water from the second lumen, such that the flow path passes from the supply connection along the first lumen and then via the termination arrangement back along the second lumen to be released via the plurality of openings, and such that variation in water pressure between the first and second lumens along the effective length causes the substantially continuous reduction in effective cross-sectional area of the flow path as a function of distance along the flow path.

There is also provided according to the teachings of the present invention, an adjustable pulsator for use in irrigation systems, the adjustable pulsator comprising an assembly defining a flow path from an inlet to an outlet, the assembly including: (a) a flow restriction deployed in the flow path; (b) a flow occlusion arrangement having an open state in which the flow occlusion arrangement has a flow resistance less than the flow restriction and a closed state in which the flow occlusion arrangement blocks flow from the inlet to the outlet, flow of water from the inlet to the outlet tending to change the flow occlusion arrangement from the closed state to the open state; and (c) a spring arrangement deployed so as to bias the flow occlusion arrangement towards the closed state, the spring arrangement including a manually adjustable adjustment mechanism for varying a biasing force applied to the occlusion arrangement, and hence a flow rate through the assembly.

According to a further feature of the present invention, the spring arrangement includes a leaf spring, and wherein the adjustment mechanism includes an externally accessible threaded collar displaceable relative to the occlusion arrangement, the threaded collar supporting two end portions of the leaf spring.

There is also provided according to the teachings of the present invention, an irrigation system comprising: (a) an elongated irrigation tube formed primarily from porous material; (b) a partition integrally formed with the elongated irrigation tube so as to subdivide an inner volume of the irrigation tube into a first lumen and a second lumen; (c) a supply connection for connecting a water supply to the first lumen; and (d) a termination arrangement configured to define a flow path from the first lumen to the second lumen, thereby defining a water flow path from the supply connection along the first lumen and then via the termination arrangement back along the second lumen.

According to a further feature of the present invention, the partition is a flexible partition such that cross-sectional areas of the first and second lumens vary as a function of a pressure difference between the first and second lumens.

According to a further feature of the present invention, the irrigation tube and the partition are integrally formed as a continuous product of uniform cross-section.

BRIEF DESCRIPTION OF THE DRAWINGS

The invention is herein described, by way of example only, with reference to the accompanying drawings, wherein:

FIG. 2 is a schematic isometric view of a single irrigation line from the system of FIG. 1;

FIG. 3 is a plan view of the irrigation line of FIG. 2;

FIG. 4A is a cross-sectional view taken along the line A-A in FIG. 3;

FIGS. 4B and 4C are enlarged views of the regions of FIG. 4A designated "B" and "C", respectively;

FIG. 12A is a side view of an adjustable flow pulsator, constructed and operative according to the teachings of the present invention, for use in the irrigation system of FIG. 1;

FIG. 12B is a cross-sectional view taken along the line B-B in FIG. 12A;

FIG. 12C is an enlarged view of the region of FIG. 12B designated "A"

DESCRIPTION OF THE PREFERRED EMBODIMENTS

The present invention is an irrigation system and corresponding method.

The principles and operation of irrigation systems according to the present invention may be better understood with reference to the drawings and the accompanying description.

Figure 1:
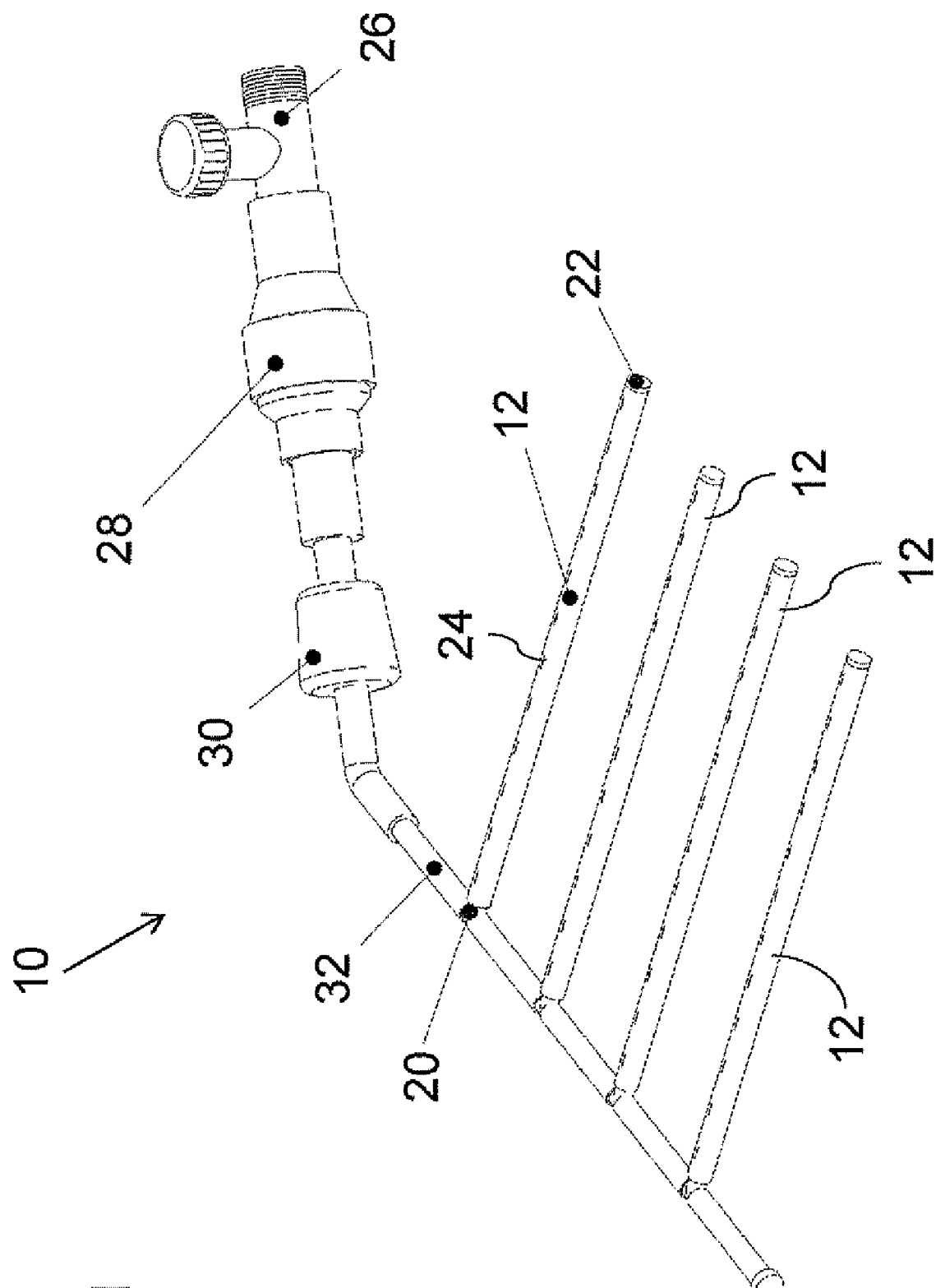
FIG. 1 is a schematic isometric view of an irrigation system, constructed and operative according to the teachings of the present invention, having a plurality of irrigation lines.

Referring now to the drawings, FIG. 1 shows an irrigation system, generally designated 10, constructed and operative according to the teachings of the present invention, with its various components being shown in more detail in FIGS. 2-12C.

Figure 5A:
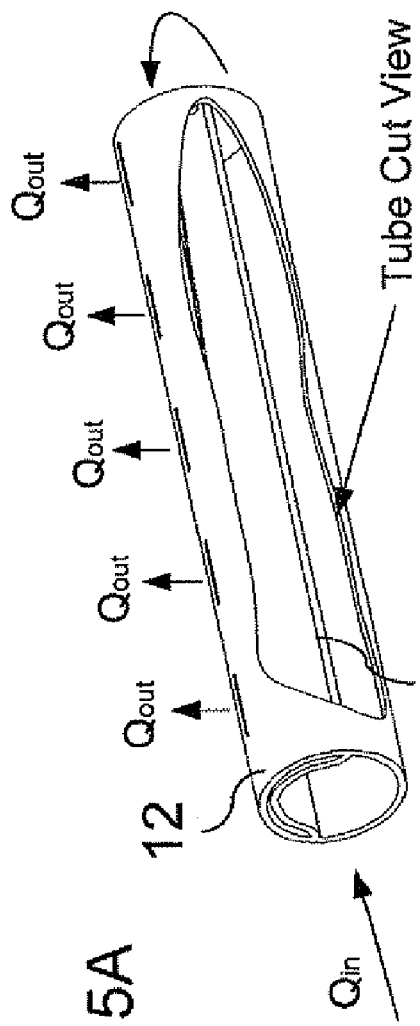
FIG. 5A is a schematic partially cut-away isometric view of the irrigation line of FIG. 2.
Figure 5B:
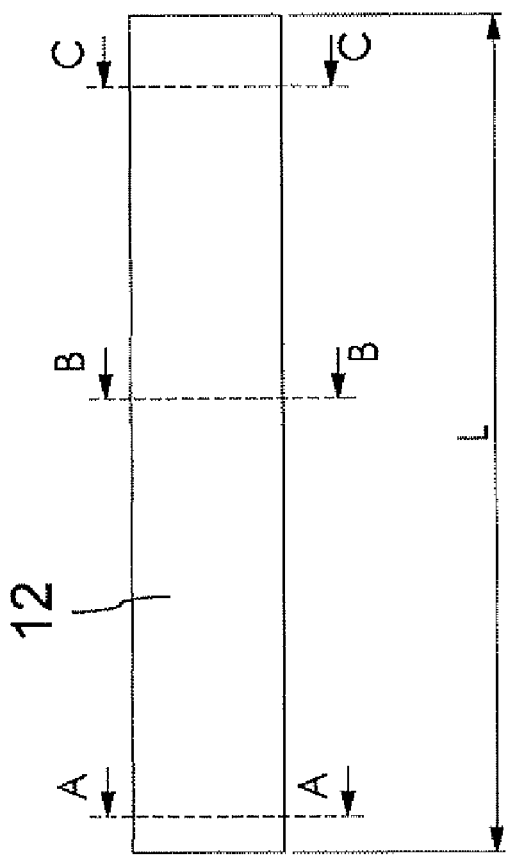
FIG. 5B is a schematic side view of the irrigation line of FIG. 2.

Generally speaking, irrigation system 10 includes one or more elongated irrigation tube 12 which includes a partition 14 integrally formed therewith so as to subdivide an inner volume of the irrigation tube into a first lumen 16 and a second lumen 18, as best seen in FIGS. 4A and 5A. Each irrigation tube 12 is connected to a supply connection 20 which connects a water supply selectively to first lumen 16. At the far end of irrigation tube 12 is a termination arrangement 22 configured to define a flow path from first lumen 16 to second lumen 18. A plurality of openings 24 are spaced along irrigation tube 12 for releasing water from second lumen 18. In particularly preferred embodiments to be described herein, partition 14 is a flexible partition such that cross-sectional areas of first and second lumens 16 and 18 vary as a function of a pressure difference between the lumens.

Irrigation system 10 as described thus far exhibits a unique combination of properties which generate controlled and substantially uniform water release from openings 24 spaced along the irrigation tube without use of individual regulating emitters at each opening. These properties will now be detailed.

Firstly, the system defines a water flow path which passes bidirectionally along irrigation tube 12 from supply connection 20 along first lumen 16 and then via termination arrangement 22 back along second lumen 18, to be released via openings 24. This flow path is roughly twice the length and averages less than half the area of a single lumen tube of similar dimensions, thereby greatly increasing the flow attenuation along the flow path. This, together with various other optional features (such as pressure regulation, pulsator regulation and variable area openings, all described below) enable release of water from simple slits or holes at normal drip irrigation flow rates without requiring individual drip regulating emitters at each outlet opening.

A further advantageous property of preferred implementations of the present invention is that the irrigation system described achieves relatively uniform flow rates along the length of the irrigation tube 12. In this regard, it should be noted that the present invention, when in use, achieves the effect of a "conical" tube, i.e., a tube along which there occurs a substantially continuous reduction in effective cross-sectional area of the flow path as a function of distance along the flow path. Production of a conical tube by normal production techniques such as extrusion would be difficult. However, flexible partition 14 of the present invention together with the aforementioned distinctive flow path together achieve an equivalent effect.

Figure 6A:
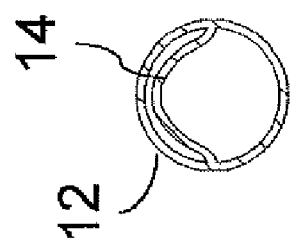
FIGS. 6A-6C are cross-sectional views taken along the lines A-A, B-B and C-C, respectively, in FIG. 5B.
Figure 6B:
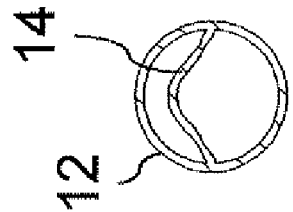
Figure 6C:
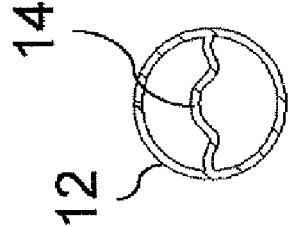

Specifically, the fluid pressure is always highest at supply connection 20 at the beginning of first lumen 16 and gradually decreases due to flow resistance along the length of first lumen 16 towards termination arrangement 22. Similarly, the pressure gradient along second lumen 18 has the highest pressure at termination arrangement 22 and gradually decreases along the flow path back towards the closed end at supply connection 20. As a result, the pressure differential between first and second lumens 16 and 18 is greatest adjacent to supply connection 20 and approaches zero near termination arrangement 22. FIGS. 6A-6C illustrate the resulting deflection of partition 14 at various locations along irrigation tube 12. At each location, displacement of the flexible partition occurs until the pressure within second lumen 18 plus the forces from the elastic reaction of the partition together balance the pressure within first lumen 16. The result is a "conical" flow path as defined above.

Without in any way limiting the scope of the present invention, the relatively uniform flow rate from openings 24 is thought to be attributable to one or both of two mechanisms:

Firstly, the effectively conical flow path of gradually decreasing cross-section described above tends to maintain the kinetic energy of the flow, thereby maintaining the flow to the most distant outlets.

Secondly, the flexibility of partition 14 between the two lumens provides some degree of direct pressure difference compensation, exposing the furthest extreme of the flow path to at least part of the input pressure, and thereby reducing the pressure differential.

Turning now to the features of preferred embodiments of the present invention in more detail, FIG. 1 shows a preferred overall structure for irrigation system 10 which includes a pressure regulator 26, which is preferably variably controllable, and a flow pulsator 28, which is also preferably variably controllable. Particularly preferred implementations of pressure regulator 26 and flow pulsator 28 will be described below with reference to FIGS. 10-11B and FIGS. 12A-12C, respectively.

In the example illustrated here, irrigation system 10 also includes a filter 30 for removing solids from the supplied water and employs conventional irrigation tubes 32 to interconnect between a number of tubes 12. It should be noted that the illustrations throughout this application are not to scale and, in particular, that the lengths of all irrigation tubes illustrated herein are typically very much longer relative to their width than they have been shown. This schematic representation is necessary in order to show clearly the various structural details of interest.

Figure 7A:
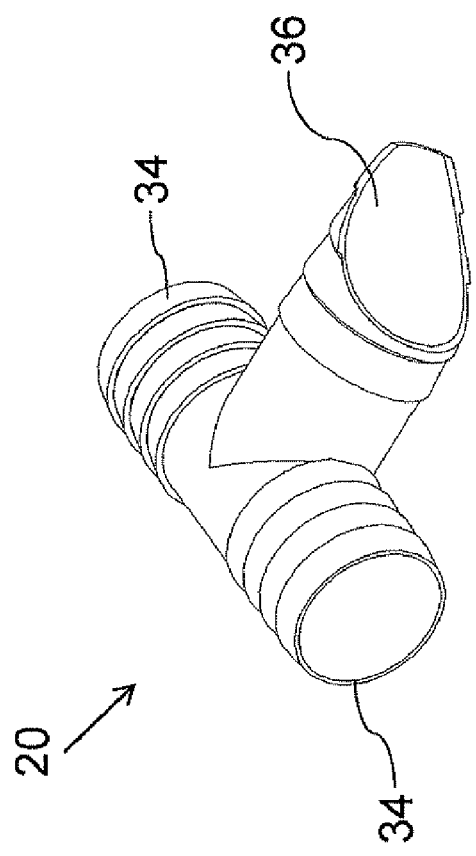
FIG. 7A is an isometric view of a supply connection from the irrigation line of FIG. 2.
Figure 7C:
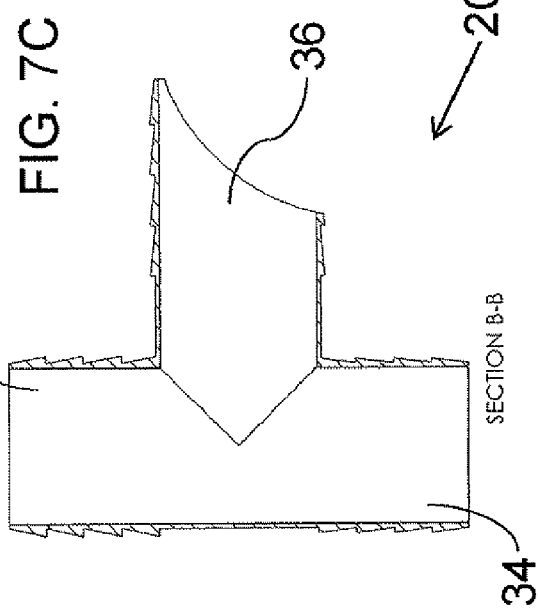
FIG. 7C is a cross-sectional view taken along the line B-B in FIG. 7B.
Figure 7B:
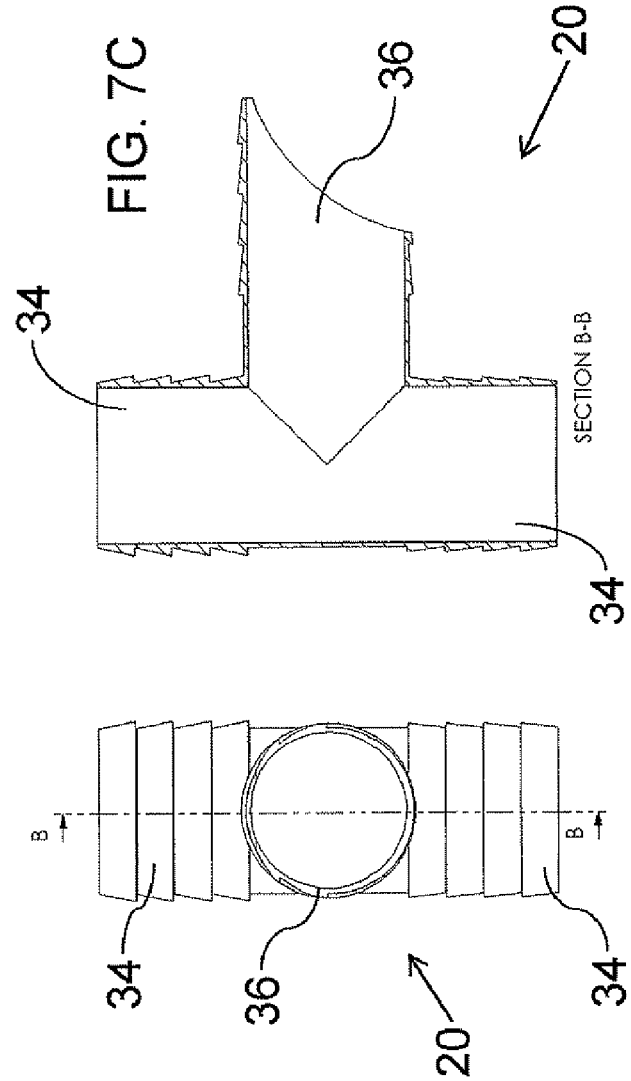
FIG. 7B is a side view of the supply connection of FIG. 7A.
Figure 8D:
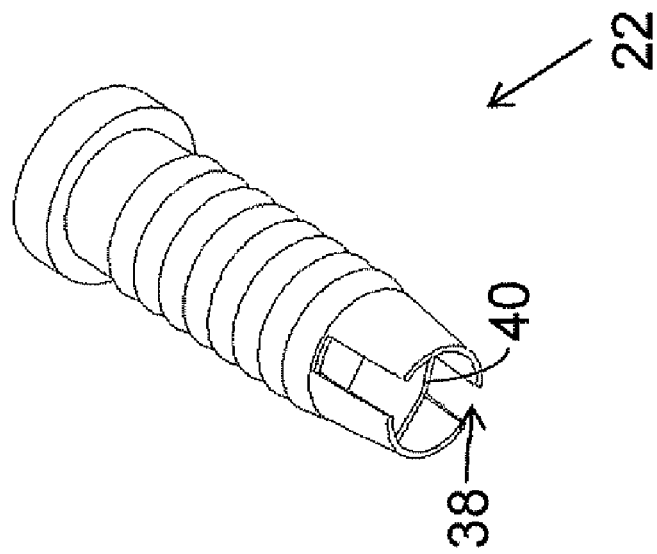
FIG. 8D is an isometric view of the termination arrangement of FIG. 8A.
Figure 8A:
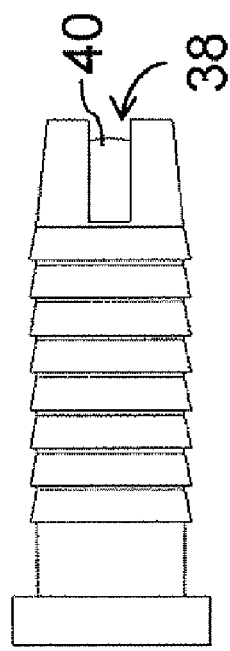
FIGS. 8A and 8B are first and second side views of a termination arrangement from the irrigation line of FIG. 2.
Figure 8B:
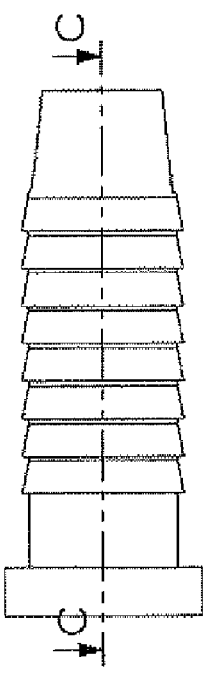
Figure 8C:
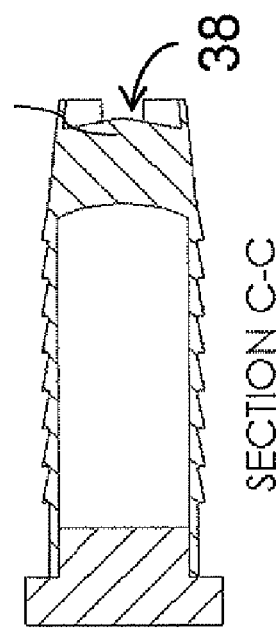
FIG. 8C is a cross-sectional view taken along the line C-C in FIG. 8B.

Turning now to supply connection 20, a preferred example of this element is illustrated in FIG. 7A-7C. As seen here, supply connection 20 is essentially a "T-connector" which allows insertion of a side branch in an otherwise straight-through supply line. The straight-through connections 34 here are implemented as conventional ribbed tube connectors, as is known in the art. The side branch connection 36 on the other hand has a distinctive beak-shaped or otherwise beveled tip. This tip serves as a wedge during insertion into first lumen 16, displacing partition 14 to one side and clamping it in position so as to seal the proximal end of second lumen 18. Clearly, depending upon the desired geometry, the connection configuration 36 may be implemented on the straight-through connection, on more than one branch connection, or in a simple non-branched (i.e., end-to-end) connector.

One preferred option for implementing termination arrangement 22 is illustrated in FIGS. 8A-8D. Here, termination arrangement 22 is implemented essentially as a hollow stopper formed with a leading slot 38 which ensures predefined alignment relative to partition 14 and a blade element 40 deployed roughly crossways relative to slot 38 so as to breach a terminal region of partition 14 as terminal arrangement 22 is inserted, thereby facilitating flow from first lumen 16 to second lumen 18.

Turning now to openings 24, as mentioned earlier, these are preferably simple apertures such as slits or holes without individual labyrinth or diaphragm drip emitters. Slits are considered particularly advantageous since they typically return to a normally-closed state when not in use, thereby preventing ingress of dirt into the tube. Slits are also of value for their ability to provide a variable aperture area, useful according to a further aspect of the present invention as an optional additional flow compensation mechanism.

Specifically, it is a particular feature of certain preferred implementations of the present invention that irrigation tube 12 and partition 14 are configured so as to cause variable area opening of openings 24 as a function of a pressure difference between first lumen 16 and second lumen 18.

Practically, this option is typically implemented by arranging the geometry of the tube wall and/or the partition to apply tension across the slits as a function of the pressure within first lumen 16 and/or the pressure difference between the lumens. Structural features which may help provide this effect include: local thickening of parts of the membrane; and arrangements of ribs for transferring forces directly from the membrane to the upper surface of the upper flow passageway.

Figure 9A:
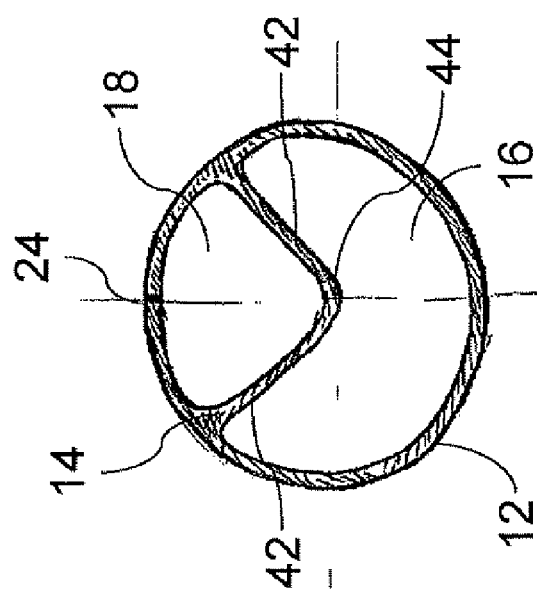
FIGS. 9A and 9B are schematic cross-sectional views taken through a variant implementation of an irrigation tube for use in the irrigation line of FIG. 2 illustrating a pressure-differential compensation mechanism in low-pressure-differential and high-pressure-differential states, respectively.
Figure 9B:
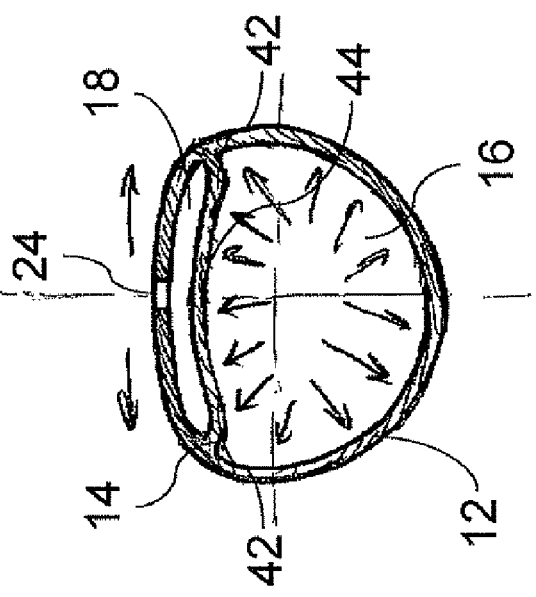

One particular non-limiting practical example is illustrated in FIGS. 9A and 9B. In this case, partition 14 is formed with two relatively stiff portions 42 interconnected at an effective hinge 44 together forming roughly a V-shape in cross-section in the unstressed state of FIG. 9A. When the pressure in first lumen 16 is significantly greater than in second lumen 18, partition 14 is displaced upwards (in the orientation as shown) and the V-shape flattened. This has the effect of stretching the outer wall of tube 12 and thereby increasing the aperture area of the openings 24.

Since the pressure in second lumen 18 is lowest where the pressure in first lumen 16 is highest, i.e., at the supply end of the irrigation tube, this structure tends open up the outlet apertures most where the second lumen pressure is lowest, thereby helping to further compensate for variations in flow rate.

Parenthetically, it will be noted in all of the above-reference features that the cross-sectional form of the irrigation tubes and partitions of the present invention are essentially uniform along the length of the tube, thereby facilitating straight-forward production of the tube by standard techniques used in the art, such as by continuous extrusion. The primary exception to the uniformity of the cross-section is the presence of spaced apart openings 24. However, these are features readily formed by a simple external device as part of the production process, and do not add any significant cost or complexity to the production process.

Figure 10:
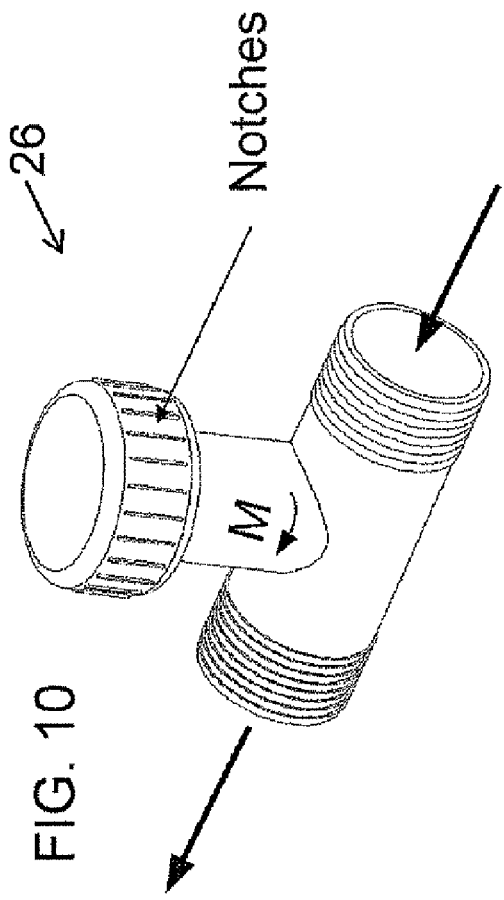
FIG. 10 is a schematic isometric view of an adjustable pressure regulator from the irrigation system of FIG. 1.
Figure 11A:
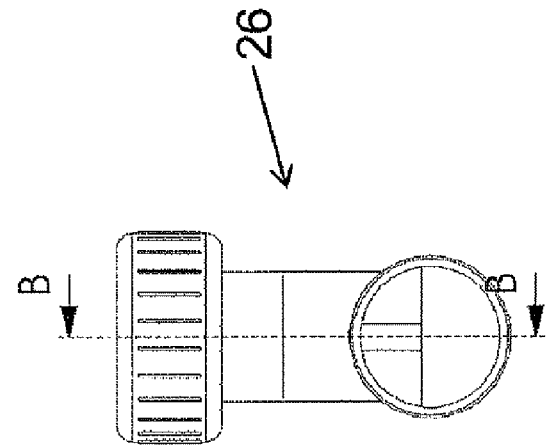
FIG. 11A is an end view of the pressure regulator of FIG. 10.
Figure 11B:
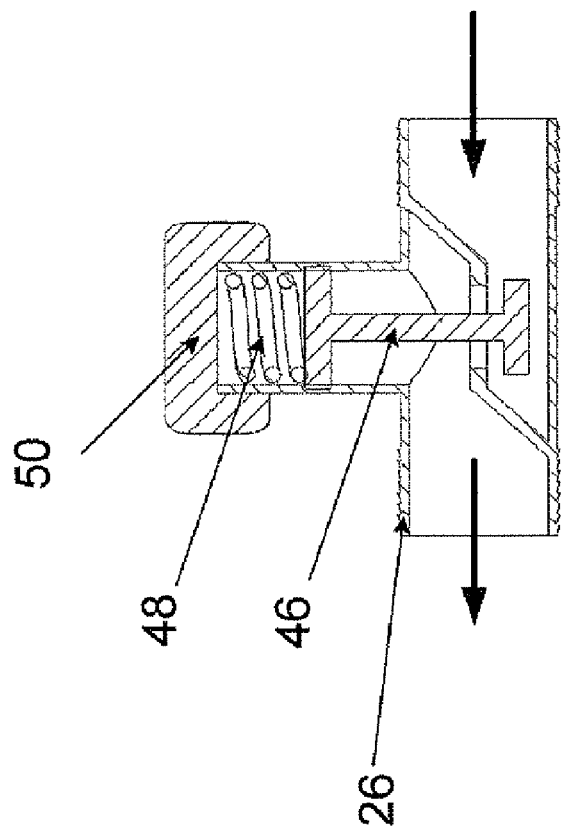
FIG. 11B is a cross-sectional view taken along the line B-B in FIG. 11A.

Turning now to FIGS. 10, 11A and 11B, as mentioned earlier, irrigation system 10 preferably employs a water pressure regulator 26 associated with supply connection 20 so as to limit the water supply pressure reaching the irrigation tube. In view of the relative uniformity of flow release along the length of the irrigation tubes, and the absence of drip emitters at the outlet openings, control of the supply pressure becomes one of the primary techniques for controlling the flow output rate of the irrigation system. For this reason, it is considered particularly useful according to the teachings of the present invention to provide an adjustable pressure regulator which allows the user to adjust the supply pressure and hence the water output.

A variety of adjustable pressure regulators are commercially available, and the specific details of the pressure regulator used are not generally critical to the present invention. By way of one non-limiting example, FIGS. 10, 11A and 11B show schematically a simple example in which a piston 46 is resiliently mounted in the flow path under action of a spring 48 which is adjustably biased by a threaded knob 50. Further details of the structure and operation of this device, or other alternative devices which may perform the desired pressure regulation, will be clear to one ordinarily skilled in the art, and are omitted here for conciseness.

Although as mentioned control of the supply pressure is an effective tool for controlling the flow output rate of the present invention, there is a lower limit below which the operating pressure may be insufficient to ensure water flow along the entire length of the first and second lumens. To facilitate further control of the flow output rate, it is a particular feature of certain preferred implementations of the present invention that irrigation system 10 also, or alternatively, includes a water flow pulsator 28 associated with supply connection 20 so as to limit a flow rate of water through the irrigation system.

Most preferably, pulsator 28 is implemented as an adjustable pulsator. A non-limiting example of a structure for adjustable pulsator 28, constructed and operative according to the teachings of the present invention, is illustrated in FIGS. 12A-12C. It should be noted that adjustable pulsator 28 described herein is believed to be of utility in contexts beyond the specific irrigation systems of the present invention, and is believed to be patentable in its own right.

By way of introduction to the particular implementation of pulsator 28 described herein, the underlying operating principles of similar pulsators may be understood with reference to one or more of U.S. Pat. Nos. 6,764,029, 5,601,381, 5,531,381, 5,353,993, 5,314,116 and 4,781,217 which are hereby incorporated by reference for that purpose. According to the present invention, only one pulsator at the water supply is required for the entire system. The pulsator presented here may be implemented in a manner essentially similar to those of the aforementioned patents, but differs primarily in that it is adjustable, so that the average flow rate (individual pulse volume and/or time between pulses) can be adjusted manually by the user.

Thus, in general terms, the adjustable pulsator of the present invention has an assembly defining a flow path from an inlet to an outlet. The pulsator assembly includes a flow restriction and a flow occlusion arrangement, both deployed within the flow path. The flow occlusion arrangement has an open state in which it presents a flow resistance less than that of the flow restriction, and a closed state in which the flow occlusion arrangement blocks flow from the inlet to the outlet. The flow occlusion arrangement is configured so that flow of water from the inlet to the outlet tends to change it from its closed state to its open state. A spring arrangement, deployed to bias the flow occlusion arrangement towards its closed state, includes a manually adjustable adjustment mechanism for varying a biasing force applied to the occlusion arrangement, and hence a flow rate through the assembly.

In the particular example illustrated here, operation of pulsator 28 is as follows: the water supply enters the manifold and passes through a narrow orifice 52. The pressure pushes Diaphragm 1 towards Diaphragm 2 and both of them start to move together. Due to the geometrical shape of the diaphragms, the first diaphragm reaches a state of increased resistance to deformation and the pressure acting directly on the second diaphragm via the opening in the first diaphragm causes the diaphragms to separate and allows flow through the peripheral apertures of the second diaphragm. The pressure drop on the inlet side of the pulsator due to the limited flow supply rate via the restricted inlet orifice 52 allows the two diaphragms to return elastically to their starting positions and restarts the cycle.

As mentioned above, it is a particularly preferred feature of the pulsator of the present invention that is it adjustable. The adjustment mechanism illustrated here is based on a curved spring 54 which can be tightened or loosened so as to vary the force which acts to return the diaphragms to their starting position. The adjustment of spring 54 is performed by turning a threaded collar 56 which increases or reduces compression of spring 54.

Figure 13:
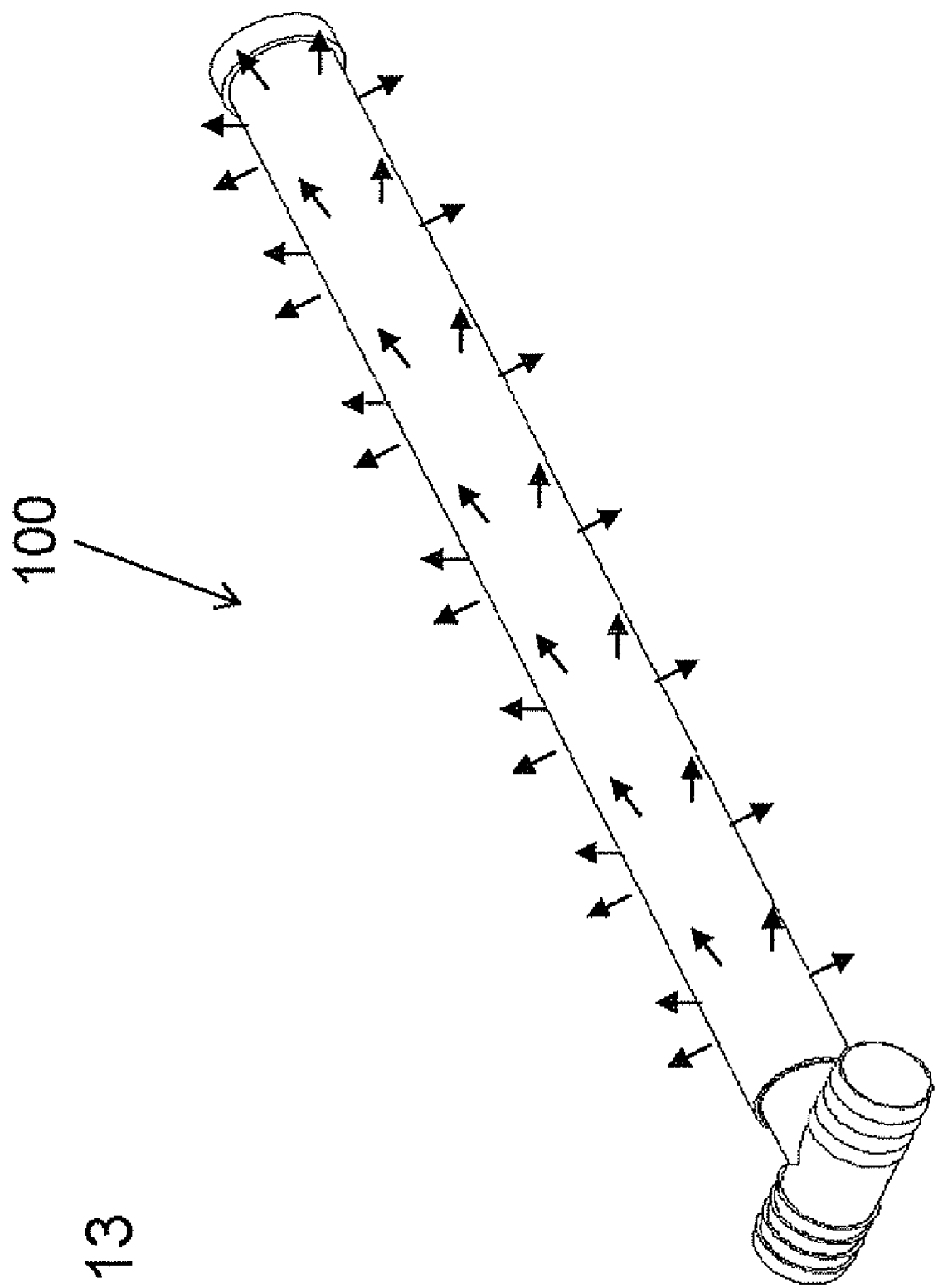
FIG. 13 is a schematic isometric view of an alternative implementation of an irrigation tube, constructed and operative according to the teachings of the present invention, formed from a porous material.

Turning now to FIGS. 13, it should be noted that the irrigation tubes of the present invention may be implemented to advantage using porous materials to for a porous irrigation tube 100, constructed and operative according to the teachings of the present invention, with all the accompanying advantages of such materials. The conical flow path effect and pressure equalizing effects of the present invention provide greatly improved uniformity of water release along the length of the porous tube than would be achieved with a regular uni-directional flow path. Typically, partition 14 is integrally formed with the tube wall from the same porous material, but any small quantity of water transferred directly between the lumens via the porous partition does not significantly impact the overall operation of the irrigation tube. Clearly, in the case of a tube formed from porous material, no openings 24 are required. In all other respects, the structure and function of the porous irrigation tube of FIG. 13 are equivalent to those of irrigation tube 12 described above.

By way of practical example, a brief description will now be provided as to how the tubes of the present invention may be designed for a particular application. A non-limiting example may be implemented according to the following steps:

1) Determine the longest length of irrigation tube to be used with the system, for example, 500 meters.

2) Determine the minimum likely available pressure of the source (e.g. 1.5 AT.).

3) Calculate and/or determine experimentally the head loses of such an irrigation tube by applying such a pressure.

4) Design and specify the dimensions of the partition so that, at the beginning of the line, the differential pressure acting on the partition deflects it close to upper side of the hose, but without contacting it.

Once this condition is satisfied, it is believed likely that the flow path when in use will approximate to a conical flow path as defined above, thereby helping to maintain the kinetic energy of the water flow through to the end of the second lumen. Where a shorter irrigation tube is to be used, pressure regulator 26 may be used to further reduce the input pressure to the tube.

It will be appreciated that the above descriptions are intended only to serve as examples, and that many other embodiments are possible within the scope of the present invention as defined in the appended claims.

What is claimed is:

1. An irrigation system comprising:
   (a) an elongated irrigation tube;
   (b) a partition integrally formed with said elongated irrigation tube so as to subdivide an inner volume of said irrigation tube into a first lumen and a second lumen;
   (c) a supply connection for connecting a water supply to said first lumen;
   (d) a termination arrangement configured to define a flow path from said first lumen to said second lumen; and
   (e) a plurality of openings spaced along said irrigation tube for releasing water from said second lumen,
   such that water flows from said supply connection along said first lumen and then via said termination arrangement back along said second lumen to be released via said plurality of openings.

2. The irrigation system of claim 1, wherein said partition is a flexible partition such that cross-sectional areas of said first and second lumens vary as a function of a pressure difference between said first and second lumens.

3. The irrigation system of claim 1, wherein said openings are implemented as slits formed in a wall of said irrigation tube.

4. The irrigation system of claim 3, wherein said irrigation tube and said partition are configured so as to cause opening of said openings as a function of a pressure difference between said first and second lumens.

5. The irrigation system of claim 1, wherein said irrigation tube and said partition are integrally formed as a continuous extruded product of uniform cross-section other than said openings.

6. The irrigation system of claim 1, wherein said termination arrangement includes a blade element deployed to breach a terminal region of said partition so as to facilitate flow from said first lumen to said second lumen.

7. The irrigation system of claim 1, further comprising a water pulsator associated with said supply connection so as to limit a flow rate of water through the irrigation system.

8. The irrigation system of claim 1, further comprising a water pressure regulator associated with said supply connection.

9. An irrigation method comprising:
   (a) providing an irrigation system defining a flow path having an effective length and a plurality of water outlets spaced along at least part of said effective length; and
   (b) supplying water to said irrigation system so that the water is released from said plurality of water outlets, wherein, at least during supplying of the water, said irrigation system exhibits a substantially continuous reduction in effective cross-sectional area of said flow path as a function of distance along said flow path.

10. The irrigation method of claim 9, wherein said irrigation system includes:
    (a) an elongated irrigation tube;
    (b) a flexible partition integrally formed with said elongated irrigation tube so as to subdivide an inner volume of said irrigation tube into a first lumen and a second lumen;
    (c) a supply connection for connecting a water supply to said first lumen;
    (d) a termination arrangement configured to define a flow path from said first lumen to said second lumen; and
    (e) a plurality of openings spaced along said irrigation tube for releasing water from said second lumen,
    such that said flow path passes from said supply connection along said first lumen and then via said termination arrangement back along said second lumen to be released via said plurality of openings, and such that variation in water pressure between said first and second lumens along said effective length causes said substantially continuous reduction in effective cross-sectional area of said flow path as a function of distance along said flow path.

11. An irrigation system comprising:
    (a) an elongated irrigation tube formed primarily from porous material;
    (b) a partition integrally formed with said elongated irrigation tube so as to subdivide an inner volume of said irrigation tube into a first lumen and a second lumen;
    (c) a supply connection for connecting a water supply to said first lumen; and
    (d) a termination arrangement configured to define a flow path from said first lumen to said second lumen,
    thereby defining a water flow path from said supply connection along said first lumen and then via said termination arrangement back along said second lumen.

12. The irrigation system of claim 11, wherein said partition is a flexible partition such that cross-sectional areas of said first and second lumens vary as a function of a pressure difference between said first and second lumens.

13. The irrigation system of claim 11, wherein said irrigation tube and said partition are integrally formed as a continuous product of uniform cross-section.

* * * * *